United States Patent [19]
Wilding

[11] 3,942,626
[45] Mar. 9, 1976

[54] CHANNEL BELT CONVEYOR

[75] Inventor: Edwin L. Wilding, Louisville, Ky.
[73] Assignee: Griffin & Company, Louisville, Ky.
[22] Filed: Sept. 16, 1974
[21] Appl. No.: 506,231

[52] U.S. Cl. .......................................... 198/192 R
[51] Int. Cl.² ........................................ B65G 15/08
[58] Field of Search ............ 198/192 R, 192 A, 191, 198/109

[56] References Cited
UNITED STATES PATENTS

| | | | |
|---|---|---|---|
| 1,405,233 | 1/1922 | Lemoine | 198/192 |
| 3,430,756 | 3/1969 | Allendorf | 198/192 |
| 3,688,892 | 9/1972 | Kieffaber | 198/192 |
| 3,815,724 | 6/1974 | Nott | 198/191 |

*Primary Examiner*—James B. Marbert
*Attorney, Agent, or Firm*—Wood, Herron & Evans

[57] ABSTRACT

A channel belt conveyor includes a bed, an elongated belt, and belt supporting flanges adjustably mounted on the bed and having lower edges spaced from the bed to form an exit passage therebetween. The belt supporting flanges are raised above the bed to support the belt edges so the belt assumes a channel-like configuration in its load bearing run. Displaced particles of conveyed material, which find their way between the belt and the flanges or bed, can work their way free through the passage without being captured or impacted, thereby reducing accumulation of impacted material and consequent belt loading. Conveyed tobacco is contained by the belt so that it does not slide along stationary portions of the conveyor, thereby forming deleterious "shorts" and dust, nor is there any area in which the tobacco can "lump". The bed of the conveyor is extended outwardly of the flanges and is turned downwardly to form the conveyor sides and vertical bed support.

12 Claims, 4 Drawing Figures

U.S. Patent  March 9, 1976  3,942,626
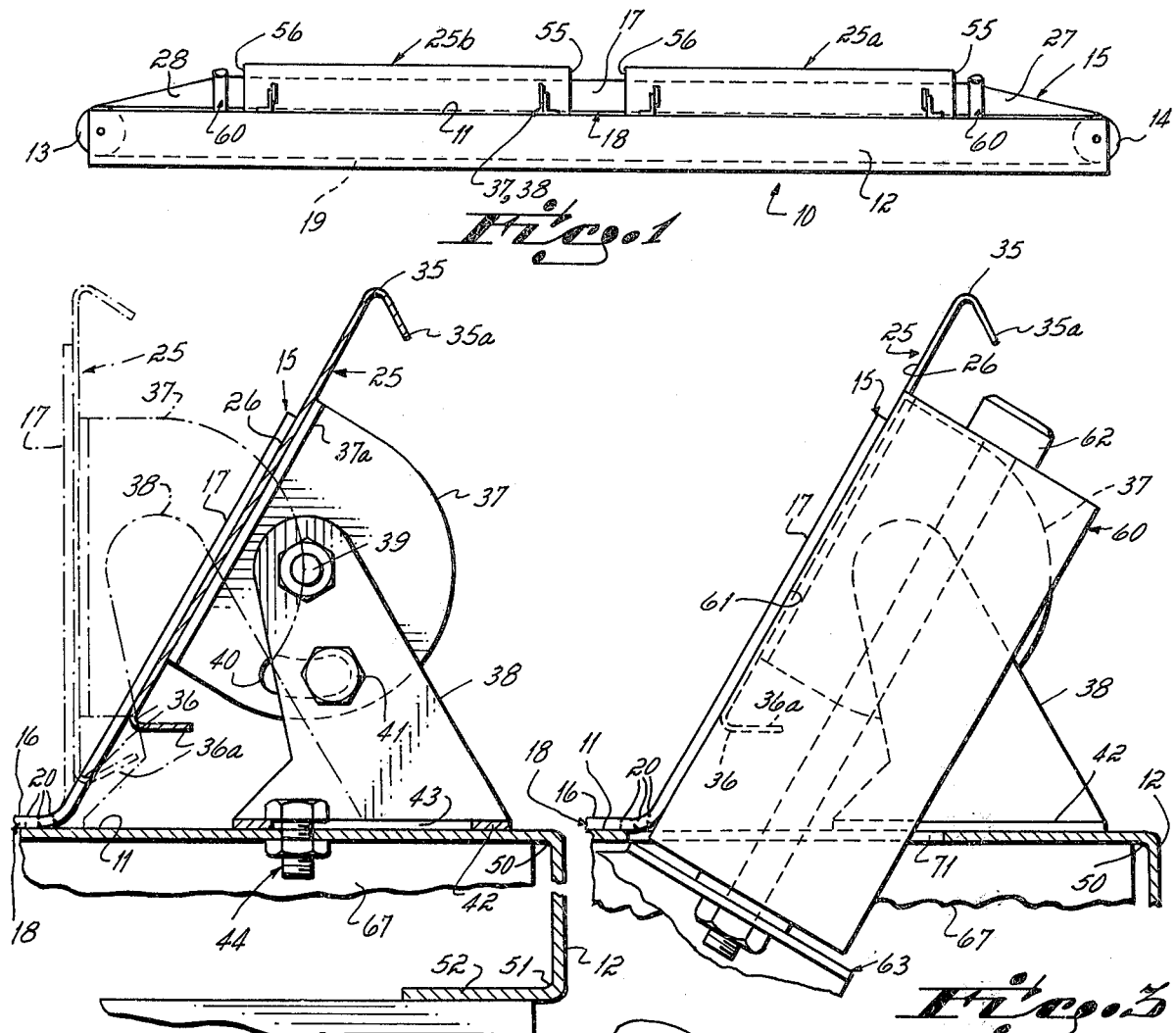
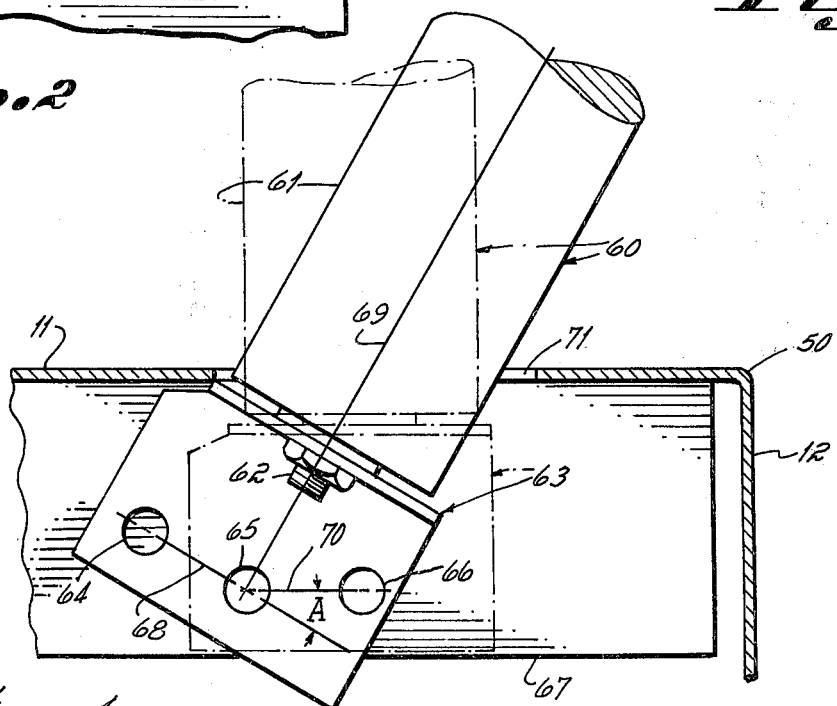

CHANNEL BELT CONVEYOR

BACKGROUND AND SUMMARY OF THE INVENTION

This invention relates to conveyors and more particularly to belt conveyors of the type hereinafter referred to as channel belt conveyors.

Essentially, a typical channel belt conveyor includes a flexible, elongated, endless belt entrained around two pulleys mounted on horizontal axes at opposite ends of a belt supporting bed. In one known prior art construction, a bed is secured between the vertical webs of two elongated, horizontally disposed, structural channels, the webs of the structural channels forming the sides of the conveyor while the belt lies flat on the bed. Elongated seals of belting material are fixed to the inside webs of the channels and extend downwardly, frictionally engaging the belt in an attempt to seal off the edges of the belt.

This form of channel belt conveyor has found a particular application in the handling of various forms of treated tobacco products, such as cut filler, strip, and the like, prior to its conversion into a consumer item. When cut filler, for example, is conveyed by such a conveyor it has been found, however, that the conveyed material contains an undesired amount of "shorts" and "dust". "Shorts" is the term applied in the trade to pieces of tobacco which are smaller than desired for commercial processing and consumer use purposes. "Dust" is the term applied to tobacco dust apparently formed from tobacco particles during handling.

It is believed that the "shorts" and "dust" are caused by degradation of the conveyed tobacco particles which rub against the seals or the conveyor sides formed by the channels. This sliding engagement tears the particles or simply abrades them and this action is believed to contribute significantly to the amount of "shorts" and "dust" in the conveyed load.

A further problem encountered with this form of conveyor is that the seals are not effective to seal off all tobacco. Tobacco particles tend to find their way under the seals to the edge of the belt where they impact or "lump" between the seal, the belt and the side of the conveyor. Additionally, tobacco particles find their way under the belt and impact between the belt and the bed of the conveyor.

The lumps of tobacco present a severe problem in that when they find their way back into the mainstream of conveyed product, they cause malfunctions in downstream treatment apparatus such as in the feed station of the making machine. Impaction of tobacco under the belt causes belt wearing and belt drag problems as will be more fully discussed below.

A still further problem with this type of conveyor is that of infestation. The conveyors must periodically be stopped in order to clean them of insects which find their way into the areas behind the seals.

In another prior art construction, side boards or flanges are attached to the bed along their lower edges at the belt sides and between the pulleys in order to bend edge portions of the belt upwardly to form the load bearing run of the belt into a "channel"-like configuration. In an alternate known prior art construction, more expensive belt supporting rollers are substituted for the side boards.

Conveyors of this type, in particular those having fixed side flanges, however, have the disadvantage, when used with tobacco products, that particles of the tobacco product tend to overflow or otherwise find their way between the belt and the flanges or beds and there accumulate and impact. As the belt continues to move, more and more tobacco particles work their way into these areas and impact, with the result that the belt is severely loaded by frictional forces caused by the impacted tobacco. As more tobacco is impacted, friction and resulting belt loading increase until an overload point is reached where the belt automatically stops or stalls. In an extreme case, the impacting may be so severe as to pull the belt apart or wear it prematurely to shreds. In the case of overloading or stalling, the driving motors must then be stopped and the whole conveyor must be cleaned. The impacted tobacco is removed and is discarded as useless waste.

As a consequence of the tobacco impaction and resultant belt loading problem, channel belt conveyors generally are now provided with substantially more horsepower output capability, for driving the belt, than normal design techniques would theoretically call for. The additional power is required in order that the conveyor might be operated, despite building accumulations of impacted tobacco, for an acceptable time between down time clean-ups. Aside from the expedient of increasing horsepower, the impaction-belt loading problem has been particularly vexing since the conveyor payload is usually a very light tobacco product weighing only several pounds per square foot of belt. Without the accumulation and impaction problem, less driving horsepower is required, yet no known solution has been proposed.

Insofar as tobacco handling is concerned then, the raised belt edge conveyor having flanges fixed to the belt supporting bed does not provide a problem-free alternative to the fixed sided-flat belt configuration first discussed above.

It has thus been one objective of this invention to provide a channel belt conveyor, of the type utilizing side flanges to lift edge portions of the belt, wherein belt loading by impaction of material particles under the belt is substantially reduced or eliminated.

It has also been desirable to provide some degree of versatility in a channel belt conveyor so that it can be used not only to handle limited varieties of tobacco, but to handle different forms of products, such as hands of tobacco, which do not require a channel belt conveyor but which could be handled on a flat belt conveyor.

It has thus been another objective of this invention to provide a channel belt conveyor having a plurality of uses including a conversion capability for handling varied products on a flat belt configuration.

In accordance with certain aspects of the present invention, a channel belt conveyor of the type having side flanges for raising edges of the belt is provided which substantially reduces the impaction of conveyed product between the belt and its supporting surfaces. A preferred embodiment of the invention includes a channel belt conveyor having a belt, a belt supporting bed, and belt edge supporting flanges removably mounted along the conveyor, each flange having a lower edge spaced form the bed and being adjustably mounted to vary the angle made between the supported belt edge portion and a central portion of the belt supported on the bed. Despite the particular inclination of the flange, its lower edge remains spaced from the bed to permit any foreign particles, which find their way between the belt and the flanges or bed, to work their way free of capture without impacting beneath the belt. Impaction and belt loading is thereby substantially reduced. Further, the flanges can be removed to permit the belt to lie flat when flat belt operation is necessary, as determined by the product to be conveyed.

In another aspect of the preferred embodiment of the invention, friction eliminating belt engaging rollers are removably mounted beneath the bed and extend upwardly therethrough to engage the belt just before belt engagement with the flanges. This reduces belt friction against the ends of the flanges as the belt is flexed from a relatively flat disposition to a channel-like configuration. Additionally, the rollers are uniquely adjustably mounted for disposition of the belt engaging roller surface in about the same angle of inclination as that of the flanges.

In still another aspect of a preferred embodiment of the invention, the bed of the conveyor extends outwardly of the flanges and then is directed downwardly to form the sides which vertically support the elongated conveyor, thereby providing a very economic one-piece structural component serving a dual function as both conveyor bed and conveyor support.

One of the primary advantages attained by the present invention is due to the substantial reduction of accumulated impacted tobacco and consequent reduction in belt loading. The necessary horsepower capability required to drive the belt can now be reduced by up to as much as 35% without detracting from the conveyor's operational efficiency. Further, the creation of "lumps" is eliminated and the creation of "shorts" and "dust" is reduced.

These and other objects and advantages of the invention will become readily apparent from the following detailed description of a preferred embodiment thereof, and from the drawings in which:

FIG. 1 is a side view of an elongated channel belt conveyor according to the invention;

FIG. 2 is a cross-sectional view showing the belt supporting flange;

FIG. 3 is a cross-sectional view showing a belt engaging roller in relation to the conveyor bed, a flange and the belt; and FIG. 4 is a view showing the mounting details of the rollers.

DESCRIPTION OF PREFERRED EMBODIMENT

Referring now particularly to the drawings, there is illustrated in FIG. 1 a channel conveyor 10 according to the invention. The conveyor includes an elongated belt supporting slide bed 11 and integral sides 12, (one of which is shown), turned downwardly from the bed to form the the lateral side of the conveyor and the vertical support for the bed. Two belt pulleys 13 and 14 are mounted on horizontal axes at each end of the elongated conveyor 10. One of the pulleys is driven by any suitable means such as a gear motor and chain drive linkage (not shown), while the other pulley is simply an idler pulley. For descriptive purposes it will hereinafter be assumed that pulley 13 is driven while the other pulley 14 is an idler pulley. Both pulleys may be either cylindrical in shape or substantially cylindrical but slightly crowned for belt tracking purposes.

An elongated endless belt 15 is mounted around the pulleys 13 and 14 such that a central portion 16 of the belt is supported directly on the elongated bed 11. The belt has two elongated edge portions 17 which extend along the opposite edges of the belt. When mounted on the conveyor, the belt provides an upper load bearing run 18 along the conveyor bed and a lower return run 19.

The belt can be manufactured from any suitable form of flexible material such as any well-known cotton canvas-like material, or from a combination of materials. Preferably, the belt is manufactured with a plurality of plies, such as seven plies, and is provided along its edges with two sets of three spaced parallel cuts 20 which extend upwardly into the belt as shown in FIG. 2. The sets of cuts are disposed on opposite sides of the belt and define, outwardly of the cuts 20, respective edge portions 17 of the belt. The cuts are preferably three plies deep and allow the edge portions 17 of the belt to be angled upwardly from the plane of the belt portion 16 as will be described.

A plurality of belt supporting means or flanges 25 are mounted along the bed 11 and provide belt supporting surfaces 26 for supporting edge portions 17 of the belt above the bed. As shown in FIG. 1, the belt is normally entrained about the pulleys 13 and 14, where the belt assumes a relatively flat configuration across its entire width. As the belt enters its load bearing run 18, however, the edge portions 17 of the belt are raised by the flanges so that the belt is reoriented at a breakover area 27 into a channel-like configuration. Assuming belt motion to the left, as viewed in FIG. 1, the belt continues this channel-like configuration until it passes the flanges 25 and breakover area 28. Thereafter, it returns to its flat form, conforming to the surface of the driving pulley 13, and is drawn through its return run beneath the bed 11 and toward pulley 14.

Each of the flanges 25 is similar to the other so only one flange will be described in detail. Each includes an upper edge 35 and a lower edge 36 (FIG. 2), formed by turning back respective portions 35a and 36a to form acute angles with the flange. The lower and upper edges of each flange extend parallel to the direction of belt movement when the flanges are mounted on the conveyor.

Each of the flanges 25 is mounted on one or more first mounting brackets 37. The first mounting brackets are in turn pivotally connected to second mounting brackets 38 via a pivot bolt 39. Brackets 37 are L-shaped, one leg 37a (not shown in FIG. 1) being adapted for connection to the rear surface of flange 25 and the other leg being provided with an arcuate slot 40. A locking bolt 41 extends through the bracket 38 and into the slot 40. When the bolts are loosened, the bracket 37 and the attached flange 25 can be rotated angularly with respect to the bed 11 of the conveyor.

In the preferred embodiment, the arcuate slot 40 is disposed in bracket 37 so that the belt supporting surface 26 of flange 25 can be rotated between about 90° and 120° with respect to the conveyor bed 11. In FIG. 2, the 120° position of the belt supporting surface 26 is shown in solid lines, while the 90° position of the belt supporting surface 26 is shown in phantom.

Each of the brackets 38 is provided with a right angle flange 42, having an elongated mounting slot 43 therein, and flange 42 is secured via bolt means 44 to the conveyor bed 11. By this means, the complete flange and bracket assembly is adjustable in a transverse direction with respect to the extension of the bed 11 beyond the belt, thereby facilitating the correct positioning of the belt supporting surface 26 in the 90° position. This adjustment insures that regardless of the inclination of the belt supporting surface 26, the brackets and flanges can always be correctly positioned so that the belt is flexed along the area defined by the parallel cuts 20.

As can be appreciated from the drawings, the lower edges 36 of the flanges 25 do not in any adjusted position engage the bed 11, but rather are spaced therefrom to form a gap or exit passage between the flange and the bed. When the conveyor is utilized to convey products such as tobacco (and particularly in the handling of tobacco in its cut filler or other small particle form), some tobacco particles will tend to overflow the belt or otherwise find their way between the edge portion 17 of the belt and the belt supporting surface 26 of the flange 25. In the present invention, however, this constitutes no specific problem as in prior claimed belt conveyors since tobacco particles are free to work their way between the belt and the flange through the exit passage between the lower edge 36 of the flange and the bed 11. The flange is not attached to or connected to the bed and thus the tobacco particles are not captured. In this manner, accumulation of compacted tobacco between the belt edge portion 17 and the belt supporting surface 26 of the flanges is reduced or entirely eliminated. As a result, frictional belt loading by impacted tobacco is substantially reduced. In addition, and since the flange does not engage the bed 11 near the flat run of the central portion 16 of the belt, the tobacco may work its way outwardly from the belt to reduce tobacco impaction between the belt and the supporting bed 11.

As a result of a substantial reduction in the impaction of tobacco between the belt and its supporting surfaces, it has now been possible to reduce the driving horsepower necessary to operate the conveyor by approximately 35% over those previously known channel belt conveyors now available on the commercial market. This substantial reduction of horsepower requirements reduces the initial cost of the channel belt conveyor and as well reduces the cost of conveyor operation since the conveyor utilizes less power and does not wear out belts so quickly.

In addition, it can be appreciated from the foregoing description that the flanges are adjustable not only to provide different desired inclinations of the edge portions of the belt, but flanges 25 and the mounting brackets 37 and 38 are completely removable from the bed 11 in order to allow the edge portion 17 of the belt to lie flat on the bed in the areas where the brackets and flanges are normally mounted. In this manner, the channel belt conveyor can be converted into a flat belt conveyor to handle varying types of products such as bound "hands" of tobacco, as opposed to tobacco in its cut filler, separate leaf, or strip form.

Proceeding now with a further description of the construction of the invention, it is to be noted in FIG. 2 that the bed 11 extends outwardly past the flange mounting area and then is bent over as at 50 to form the vertically depending and laterally extending conveyor sides 12. The side 12 is thereafter bent inwardly, as at 51, to form a mounting flange 52 for mounting the conveyor on suitable supports and for providing mounting surfaces for conveyor cross-tie supports and the like. In this manner, the conveyor is essentially made from an integral piece of sheet material in a very economic form, the conveyor sides which provide the vertical conveyor support actually are formed from the same piece of material as the belt supporting bed 11. This substantially simplifies the construction of the channel belt conveyor.

While a plurality of flanges 25 may be utilized on the channel belt conveyor, as indicated by FIG. 1, two flanges 25a and 25b are provided on each side of the conveyor in the preferred embodiment. Of course, either one or more than two flanges could be used on either side of the conveyor. Assuming a direction of belt travel from right to left as viewed in FIG. 1 and for descriptive purposes, each of the flanges has a leading end 55 and a trailing end 56. The trailing end 56 of flange 25a and the leading end 55 of flange 26b are spaced apart a predetermined distance, for example, approximately 6 inches. The leading end 55 of flange 25a is located near the break-over area 27 of the belt 15. When the belt moves around the idler pulley 14, it is in a relatively flat configuration. As it moves off the pulley 14 toward the flange 25a, however, it is broken over to assume the channel-like-cross-section of the conveyor throughout the length of the conveyor between the flanges. Since the belt is flexed upwardly at the break-over point 27, it normally would tend to engage the leading end 55 of the flange 25a and to wear upon that end.

In order to reduce the resultant friction at the leading end 55 of the flange 25a, and additionally at the trailing end 56 of the flange 25b, where the belt returns from the channel configuration to its flat configuration on the pulley 13, rollers 60 are provided adjacent the respective ends of the flanges. Each of the rollers 60 includes a roller surface 61 which is preferably inclined to lie approximately within the same plane as the belt supporting surface in the break-over areas 27 and 28 and friction against the leading and trailing flange ends is thereby reduced.

In the preferred embodiment, each of the rollers 60 is a generally cylindrical roller and is mounted on an axis pin 62. Pin 62 is in turn mounted on a roller mounting bracket 63. The roller mounting bracket 63 is provided with means for mounting the roller at substantially the same inclination as the inclined belt engaging surface 26 of the flange 25. More specifically, the roller mounting bracket is constructed to provide for mounting of the roller's belt engaging surface at both approximately 90°, with respect to the bed 11 of the conveyor, and at approximately 120° with respect to the bed. In order to so adjustably mount the roller, the roller mounting bracket 63 is provided with three apertures 64, 65, and 66. These apertures are spaced to selectively cooperate with two apertures located in a frame portion or cross tie 67 of the conveyor. The centers of the apertures 64 and 65 lie on a straight line 68 which is normal to the axis 69 of the roller 60. The center of the aperture 66 lies on a line 70 which intersects the line 68, at an angle A with respect thereto, and at the center of the aperture 65. The angle A, formed by the lines 68 and 70, is preferably equal to the angular difference between the 90° and 120° positions of the flange and of the roller surface in the preferred embodiment. Thus, angle A is preferably equal to 30°. As shown in FIG. 4, the roller shown by the solid lines therein is mounted to form an angle of 120° between the roller surface and the belt supporting bed 11 of the conveyor. The roller is thus securely mounted to the conveyor, in the position shown in FIG. 4, by the use of bolts extending through the apertures 65 and 66, and through the corresponding apertures in the frame 67. When it is desired to mount the roller at its 90° position, the bolts are removed from the apertures 65 and 66 and the roller mounting bracket 63 is rotated so that its apertures 64 and 65 now align with the two apertures (which have centers on a line parallel to the plane of bed 11) in the frame member 67 in the conveyor. The roller is thereby supported at 90° with respect to the bed 11 in order to correspond with the 90° position of the belt flanges when perpendicular belt edges are desired in the conveying operation. Of course, it will be appreciated that three holes could be provided in either the roller mounting brackets 63, or in the frame 67, with the corresponding element having only two holes. Also, the angular disposition of the holes could be changed or varied to provide the desired angular inclination of the roller surface.

In addition, it will be noted that the mounted rollers extend upwardly from beneath the bed 11 through an aperture 71 so that the roller surface can be positioned near or adjacent the selected ends of the flanges 25. When the flanges are removed to provide flat belt conveyor, the rollers may also be removed, the belt merely sliding over the apertures 71. Since the load of the conveyor (considering tobacco products) is only on the order of from one to ten pounds of load pressure per square foot of belt, the apertures 71 do not hinder the operation of the belt in a flat operating mode.

As mentioned above, the roller surface is preferably inclined so that it is in approximately the same plane as that of the belt supporting surface 26 of the flanges 25. This may vary to some extent depending on manufacturing tolerances and the like. In addition, it might be found desirable to locate the belt engaging roller surface so that the belt is engaged in a plane slightly inwardly of the flange plane to insure that the belt will not engage the end of the flange and wear thereon.

From the foregoing, it will be seen that the channel belt conveyor of the present invention provides a unique belt supporting structure by which the edge portion of the belt can be supported at varying angles, or by which the belt edge supporting structure can be removed to provide a flat belt for specified conveying purposes. In addition, and despite the angular disposition of the flanges, the lower edge of the flange is spaced from the bed 11. This allows any foreign particles, which find their way between the belt and the various supporting surfaces, to work free of capture therebetween, and thereby the impaction of foreign particles between the belt and supporting surfaces is greatly reduced. As a result, frictional belt loading is substantially reduced, the horsepower necessary to drive the belt can also be substantially reduced, and the belt wear is substantially reduced.

Still further, and by the elimination of fixed elongated belt seals, the conveyor of the present invention eliminates those areas in which tobacco product could "lump" and there find its way back into the conveyed product mainstream only to cause malfunctions of downstream processing or handling equipment. The conveyed product is contained by the moving belt only, any product which does overflow works its way free through the exit passage between the flange and the bed, rather than impacting. The creation of "shorts" and "dust" is thereby reduced, as is infestation, and the flange supported raised belt edge configuration is therefore modified according to the invention to provide an efficient, problem eliminating, solution to the handling of products in a channel belt conveyor.

These and other modifications and alterations will become readily apparent to those of ordinary skill in the art, from the above description, without departing from the scope of this invention and the applicant intends to be bound only by the claims appended hereto.

I claim:

1. A conveyor including:
    an elongated belt having spaced parallel edge portions on opposite sides of a central belt portion,
    a bed providing a surface slidably supporting at least a central portion of said belt for load-bearing movement therealong,
    a plurality of elongated belt supporting flange means having respective belt engaging surfaces for slidably supporting the opposite edge portions of the belt above the bed, each of said belt edge portions being disposed at an angle with respect to the central portion of the belt supported by the bed, said supporting flange means having lower edges approximately parallel to the direction of belt movement along said bed and proximate, but spaced from said bed so as to define an exit passage to permit portions of conveyed material, which have overflowed said belt, to work free from between said belt, said belt supporting flange means and said bed, by outward movement through said passage, and
    mounting means for adjustably mounting said belt supporting flange means so that said angle can be adjusted while maintaining said passage open.

2. A conveyor as in claim 1 wherein said belt engaging surfaces are inclined with respect to the bed, and wherein said angle of inclination is selectively fixed within an approximate range of about 90° to about 120°.

3. A conveyor as in claim 1 wherein said mounting means includes at least one first bracket mounted on each flange means, at least one second bracket mounted on said bed and pivotally connected to said first bracket, and
    means to secure said first bracket against rotation with respect to said second bracket to hold said flange means and said belt at a predetermined angle with respect to said bed.

4. A conveyor as in claim 3 wherein said mounting means and said belt supporting flange means are removable from said bed in order to permit said belt to lie completely flat on said bed.

5. A conveyor as in claim 1 further including belt supporting rollers having belt engaging surfaces, said rollers being disposed adjacent selected ends of respective support flange means, and being mounted to incline the belt engaging roller surfaces at an angle with respect to said bed.

6. A conveyor as in claim 5 wherein said belt supporting rollers are mounted on brackets having one plurality of mounting holes, and further including another plurality of corresponding mounting holes in a stationary portion of said conveyor, one of said pluralities of mounting holes having hole centers, one of which is transversely spaced from a straight line extending through the centers of at least two other holes of said one plurality, both of said pluralities of holes thus providing means for mounting said bracket and disposing said roller surface at a plurality of angles, with respect to said bed, one of said angles being approximately equal to the angle between the belt edge portion and the belt supported by the bed.

7. A conveyor as in claim 6 wherein said other plurality of mounting holes in said stationary conveyor portion comprises two holes having centers on a first straight line parallel to the bed and wherein said one plurality of holes in said brackets includes three holes, two of which have centers on a second straight line normal to the axis of said roller, and another of which has a center transversely spaced from said second line and on a third line disposed to intersect the center of one of said two holes in said other plurality.

8. A conveyor as in claim 3 wherein said second bracket is adjustably mounted on said bed for movement in a direction parallel to the plane of the elongated bed.

9. A conveyor as in claim 5 including a roller opening in said bed, adjacent ends of respective support flange means, said rollers being connected to said conveyor below said bed and extending upwardly through said roller openings to support said belt beyond the ends of said flange means.

10. A conveyor as in claim 1 wherein said bed includes an integral piece of sheet material forming said bed and extending outwardly beyond said surface supporting a central portion of said belt, then downwardly at opposite parallel edges of the conveyor to form vertical side supports therefor.

11. A conveyor as in claim 1 wherein each of said flange means has upper and lower elongated parallel edges formed by bending portions of said flange means rearwardly from said belt engaging surfaces.

12. A conveyor as in claim 1 including substantially cylindrical belt engaging pulleys at each end of said conveyor, said belt conforming across its width to the surface of the pulleys when drawn therearound, the edge portions of the belt thereafter being flexed to assume an angle with respect to said central portion of said belt on said bed.

* * * * *